(12) United States Patent
Miyawaki

(10) Patent No.: US 10,602,287 B2
(45) Date of Patent: Mar. 24, 2020

(54) AUDIO TRANSMISSION SYSTEM

(71) Applicant: QualitySoft Corporation, Wakayama (JP)

(72) Inventor: Makoto Miyawaki, Wakayama (JP)

(73) Assignee: QUALITYSOFT CORPORATION, Wakayama (JP)

(*) Notice: Subject to any disclaimer, the term of this patent is extended or adjusted under 35 U.S.C. 154(b) by 0 days.

(21) Appl. No.: 16/354,577

(22) Filed: Mar. 15, 2019

(65) Prior Publication Data
US 2019/0297438 A1    Sep. 26, 2019

(30) Foreign Application Priority Data
Mar. 20, 2018 (JP) ................... 2018-051882

(51) Int. Cl.
| | | |
|---|---|---|
| H04R 27/04 | (2006.01) | |
| B64C 39/02 | (2006.01) | |
| G10L 13/04 | (2013.01) | |
| G10L 13/08 | (2013.01) | |
| G05D 1/00 | (2006.01) | |

(52) U.S. Cl.
CPC ........... *H04R 27/04* (2013.01); *B64C 39/024* (2013.01); *G05D 1/0038* (2013.01); *G10L 13/043* (2013.01); *G10L 13/086* (2013.01); *B64C 2201/126* (2013.01)

(58) Field of Classification Search
None
See application file for complete search history.

(56) References Cited

U.S. PATENT DOCUMENTS

| | | | | |
|---|---|---|---|---|
| 6,385,586 | B1* | 5/2002 | Dietz | G06F 17/289 704/251 |
| 9,747,901 | B1* | 8/2017 | Gentry | G10L 15/22 |
| 2016/0350286 | A1* | 12/2016 | Murthy | G01C 21/3602 |
| 2017/0264907 | A1* | 9/2017 | Barre | H04N 21/85406 |
| 2018/0146312 | A1* | 5/2018 | Kono | H04Q 9/00 |
| 2018/0233007 | A1* | 8/2018 | Williams | A61K 31/55 |
| 2019/0227555 | A1* | 7/2019 | Sun | G05D 1/0094 |

FOREIGN PATENT DOCUMENTS

| | | |
|---|---|---|
| JP | 2015-126535 | 7/2015 |
| WO | 2016/171160 | 10/2016 |

* cited by examiner

*Primary Examiner* — Paul W Huber
(74) *Attorney, Agent, or Firm* — Wenderoth, Lind & Ponack, L.L.P.

(57) ABSTRACT

An audio transmission system of the present invention includes: an unmanned aircraft; a steering terminal that is used to steer the unmanned aircraft; and an information terminal configured to access a server providing a service for translating text data created in an official language of a country into a designated language other than the official language, and converting the translated text data into audio data, the information terminal being able to download the audio data from the server. The information terminal transmits the audio data in the designated language downloaded from the server to the unmanned aircraft, and the unmanned aircraft outputs the audio data in the designated language as an audio message from a speaker attached to an airframe.

8 Claims, 6 Drawing Sheets

AUDIO TRANSMISSION SYSTEM

CROSS REFERENCE TO RELATED APPLICATIONS

The disclosure of Japanese Patent Application serial No. 2018-51882, filed on Mar. 20, 2018, including the specification, drawings and abstract is incorporated herein by reference in its entirety.

BACKGROUND OF THE INVENTION

Field of the Invention

The present invention relates to an audio transmission system for publicly transmitting a message by audio.

Description of the Related Art

Methods for publicly transmitting a message by audio include: a method of using a loudspeaker installed on a roof of a municipal office or the like; and a method of mounting a loudspeaker on a vehicle and going around an assigned area while a person drives.

Among these, in a method of using a fixed loudspeaker, the volume reaches an unpleasant level near where the speaker is installed. Also, since there is a limit to the size of the area that is covered and a loudspeaker needs to be installed in each certain area, the installation cost increases.

On the other hand, in the method of mounting a loudspeaker on a vehicle, transmission will take time if the area is large, and there will be a problem regarding the safety of the people riding in the vehicle making the round if the information that can be transmitted is emergency information, such as disaster information.

As a means for solving the above-described problems, a system has been proposed in which a speaker is mounted on an unmanned aircraft called a drone, and a message is transmitted by audio while moving the drone (see WO 2016/171160).

If the audio transmission system disclosed in WO 2016/171160 is used, there is no need to output audio at a large volume, and even if target people are sparse in a large area, information can be transmitted by audio to them efficiently, inexpensively, and safely.

On the other hand, nowadays, the number of people visiting foreign countries for the purpose of sightseeing has increased, and foreign people have started frequently visiting not only sightseeing areas and cities, but also regional towns and cities that have hardly ever been seen before.

Under this circumstance, in the case where people are to be guided for evacuation accompanying the occurrence of a disaster, or in the case of giving a warning that entry of a dangerous area or the like is prohibited, with the above-described conventional audio transmission system, the message is transmitted in the official language of the country being visited, and therefore foreign people visiting the region cannot be appropriately guided and entry of dangerous areas and the like cannot be prevented.

As a solution for the above-described problem, it is conceivable that a person proficient in a foreign language is employed as the operator of the drone and the operator conveys the message in the foreign language from the speaker of the drone. However, in practice, it is very difficult to find an operator who is proficient in a foreign language.

BRIEF SUMMARY OF THE INVENTION

The present invention has been obtained in view of such a circumstance, and aims to provide an audio transmission system that can transmit a necessary message using a drone, without distinguishing between local people and foreign people.

In order to achieve the above-described aim, an audio transmission system according to the present invention includes:

an unmanned aircraft including a plurality of rotors, the unmanned aircraft being able to fly upward, downward, leftward, and rightward in air, and having an airframe to which a speaker is attached;

a steering terminal that can communicate with the unmanned aircraft by radio, the steering terminal being used to steer the unmanned aircraft; and an information terminal configured to access, via a network, a server providing a service for translating text data created in an official language of a country into a designated language other than the official language, and converting the translated text data into audio data, the information terminal being able to download the audio data from the server, wherein the information terminal transmits the audio data in the designated language downloaded from the server to the unmanned aircraft, and the unmanned aircraft outputs the audio data in the designated language as an audio message from the speaker attached to the airframe.

According to the audio transmission system according to the present invention, evacuation guidance can be appropriately given to a foreign person who does not understand the official language of the country being visited during a disaster, and entry of a restricted area or the like can be prevented.

These and other objects, features and advantages of the present invention will become more apparent upon reading of the following detailed description along with the accompanied drawings.

DETAILED DESCRIPTION OF THE INVENTION

Hereinafter, an audio transmission system according to embodiments of the present invention will be described with reference to the drawings.

Embodiment 1

Figure 1:
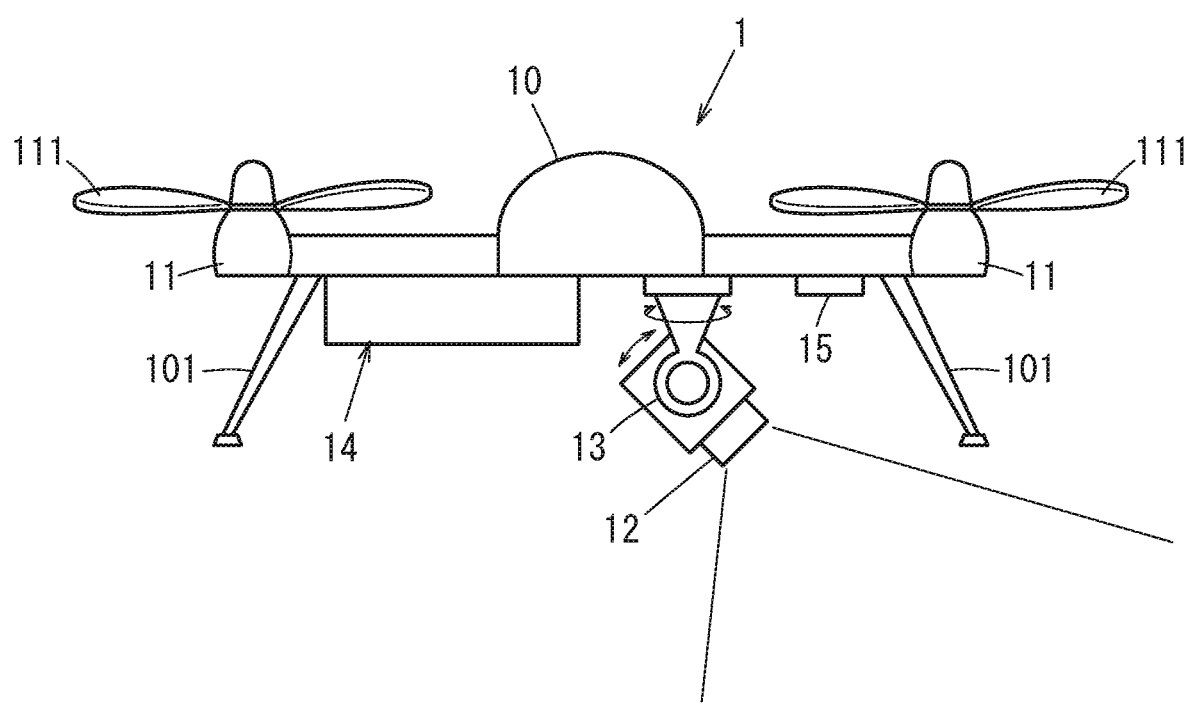
FIG. 1 is a plan view showing an external appearance of a drone used in Embodiment 1 of the present invention.
Figure 2:
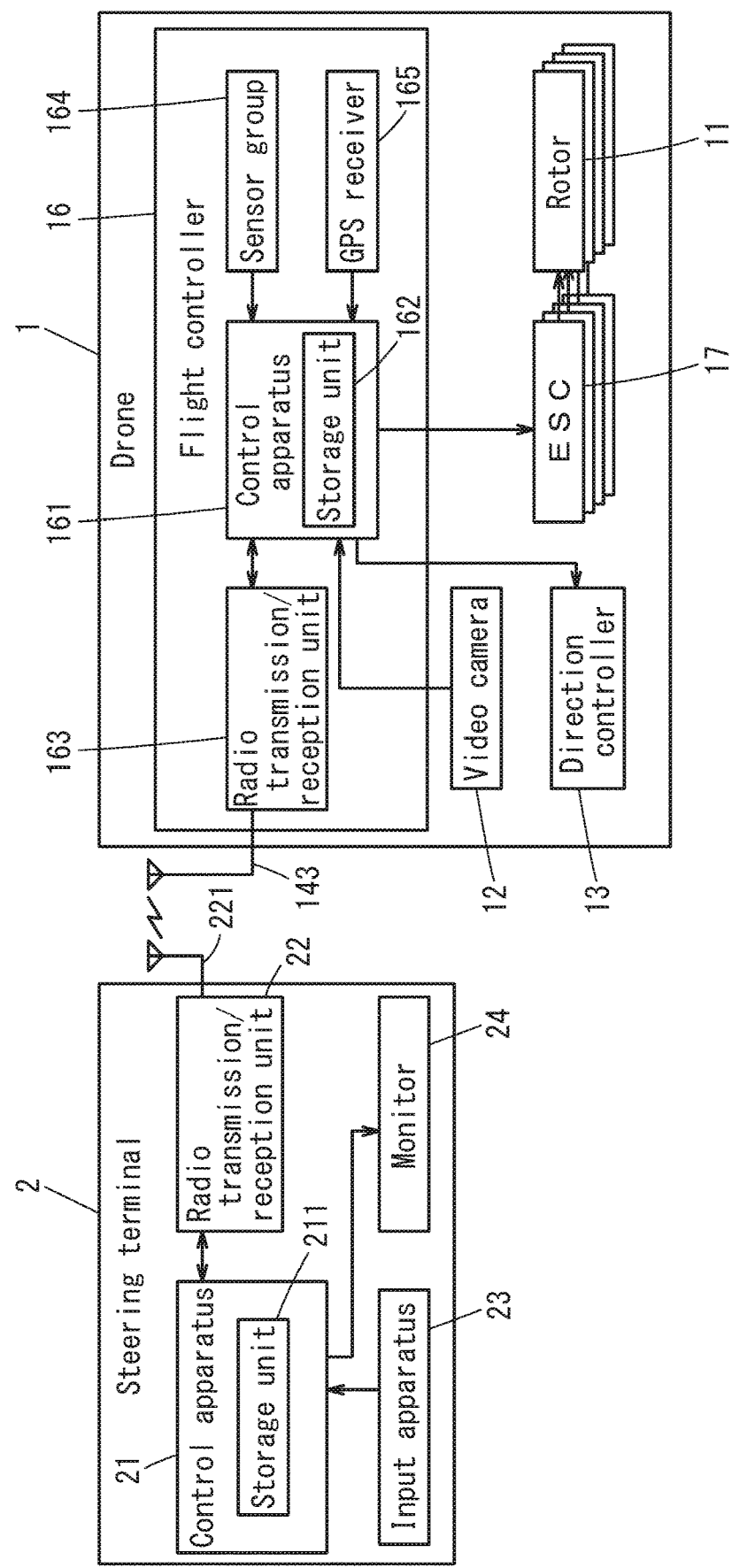
FIG. 2 is a block diagram showing a configuration of a steering system of the drone of Embodiment 1.

External Appearance of Drone and Configuration of Steering System FIG. 1 shows an external appearance of a drone used in Embodiment 1 of the present invention. Also, FIG. 2 shows a configuration of the steering system of the drone.

In general, "drone" indicates an unmanned aircraft that can be remotely operated or automatically steered. As shown in FIG. 1, in the present embodiment, a drone 1 is used which has rotors 11 attached to leading ends of four arms protruding in four directions from an airframe 10, and lift is generated by rotating the rotors 11.

The rotors 11 are constituted by blades 111 and motors (not shown), and the blades 111 are attached to rotational shafts of the motors. A reaction is generated by changing the directions of turning the rotors 11, and attitude control and altitude maintenance are performed by integrating data of a gyrosensor and an air pressure sensor while preventing the airframe itself from rotating. Four legs 101, a video camera 12, a direction controller 13 for changing the imaging direction of the video camera 12, a speaker 14, and a microphone 15 are attached to the lower surface of the airframe 10.

The direction controller 13 is equipped with two motors (not shown), and by controlling the rotation of each motor, the direction controller 13 can rotate in a horizontal plane and a vertical plane as indicated by the arrows and change the imaging direction of the video camera 12.

A configuration of a steering system of the drone 1 will be described with reference to FIG. 2. The drone 1 is operated by an operator and is used integrally with a steering terminal 2 for giving instructions for steering by radio.

The drone 1 includes the above-described rotor 11, the video camera 12, the direction controller 13, the speaker 14, and the microphone 15, as well as a flight controller 16, an ESC (electronic speed controller) 17, and a battery. Direct-current power from a battery (not shown) is supplied to the units, and thus the function of each is demonstrated.

The flight controller 16 manages the operations of the four rotors 11 in a centralized manner, and controls the attitude and flight operation of the airframe 10 in the air. The flight controller 16 includes a control apparatus 161 that functions as a microcontroller, and the control apparatus 161 is constituted by a CPU for performing arithmetic processing, a ROM storing a program that defines operations of the CPU, and a RAM functioning as a working memory for the CPU.

The flight controller 16 further includes a radio transmission/reception unit 163 that exchanges signals with the steering terminal 2, a sensor group 164 that is used for flight control, and a GPS receiver 165. The sensor group 164 includes: an acceleration sensor and angular velocity sensor that detect the velocity and angular velocity of the airframe 10, an air pressure sensor for detecting the altitude of the airframe 10, and a geomagnetism sensor for detecting the orientation of the airframe 10.

The control data output from the control apparatus 161 is input to the ESCs 17 connected to the four rotors 11, and the rotation rates and rotation speeds of the motors rotating the rotors 11 are controlled.

Based on the output data of the above-described sensor group 164 and the GPS receiver 165, the control apparatus 161 acquires positional information, including the inclination and rotation of the airframe 10, the latitude and longitude during flight, the height of the airframe 10, and the azimuth of the airframe 10.

The control apparatus 161 is equipped with a storage unit 162 constituted by a non-volatile memory, and the storage unit 162 stores a program in which an algorithm for controlling the attitude and basic flight operation of the drone 1 during flight is installed. The program causes the drone 1 to fly while correcting the attitude and position of the airframe 10 according to an instruction signal sent from the steering terminal 2.

The steering of the drone 1 may be performed manually by the operator using the steering terminal 2, or a program determining the longitude and latitude, altitude, flight route, and the like may be stored in advance in the storage unit 162 and the drone 1 may be caused to fly autonomously to a destination.

The image signal of the video camera 12 mounted on the drone 1 is converted into a high-frequency signal by the radio transmission/reception unit 163, and thereafter is transmitted from an antenna 143 as a radio wave in the 2.4 GHz band. The image signal received by an antenna 221 of the steering terminal 2 is displayed on the screen of a monitor 24.

Note that in the present embodiment, a drone was used which has four rotors attached in the periphery of the airframe and a direction controller driven by two motors, but the size of the airframe of the drone, the number of rotors, the structure of the direction controller, and the like need only be selected as appropriate according to the size and weight of the speaker and video camera mounted on the airframe.

Next, the steering terminal 2 includes a control apparatus 21, a radio transmission/reception unit 22, an input apparatus 23, and a monitor 24. Similarly to the control apparatus 161 of the flight controller, the control apparatus 21 is constituted by a CPU, a ROM, and a RAM, processes data received from the drone 1, and generates data to be transmitted to the drone 1.

As described above, the monitor 24 displays an image captured by the video camera 12 of the drone 1. The monitor 24 displays not only images, such also the flight position and the like of the drone 1.

The control apparatus 21 includes a storage unit 211 constituted by a non-volatile memory, and the storage unit 211 stores an image signal, flight position data, and the like received from the drone 1. The data stored in the storage unit 211 can later be displayed on the monitor 24 through an operation performed by the operator.

The radio transmission/reception unit 22 realizes a function similar to that of the radio transmission/reception unit 163 of the drone 1, converts a steering instruction signal generated by the control apparatus 21 into a high-frequency signal, transmits the high-frequency signal from the antenna 21 to the drone 1, receives a radio signal transmitted from the drone 1, and reproduces an image signal or the like.

The input apparatus 23 is used to steer the drone and is constituted by joysticks and buttons. As shown in FIG. 1 described above, the video camera 12 can be attached to the airframe 10 of the drone via the direction controller 13, and the imaging direction of the video camera 12 can be changed by rotating the motors equipped in the direction controller 13 according to an instruction signal generated by the input apparatus 23.

In the normal state, the video camera 12 faces frontward and obliquely downward with respect to the forward direction of the drone 1, and therefore the operator steers the drone 1 while viewing an image captured in the obliquely downward direction on the monitor 24 while the drone 1 is in flight.

Configuration of Audio Data Transmission System Next, a configuration of an audio data communication system for outputting audio data acquired by a server of a "text recitation service" from a speaker mounted on a drone as an audio message will be described with reference to FIGS. 3 and 4.

Figure 3:
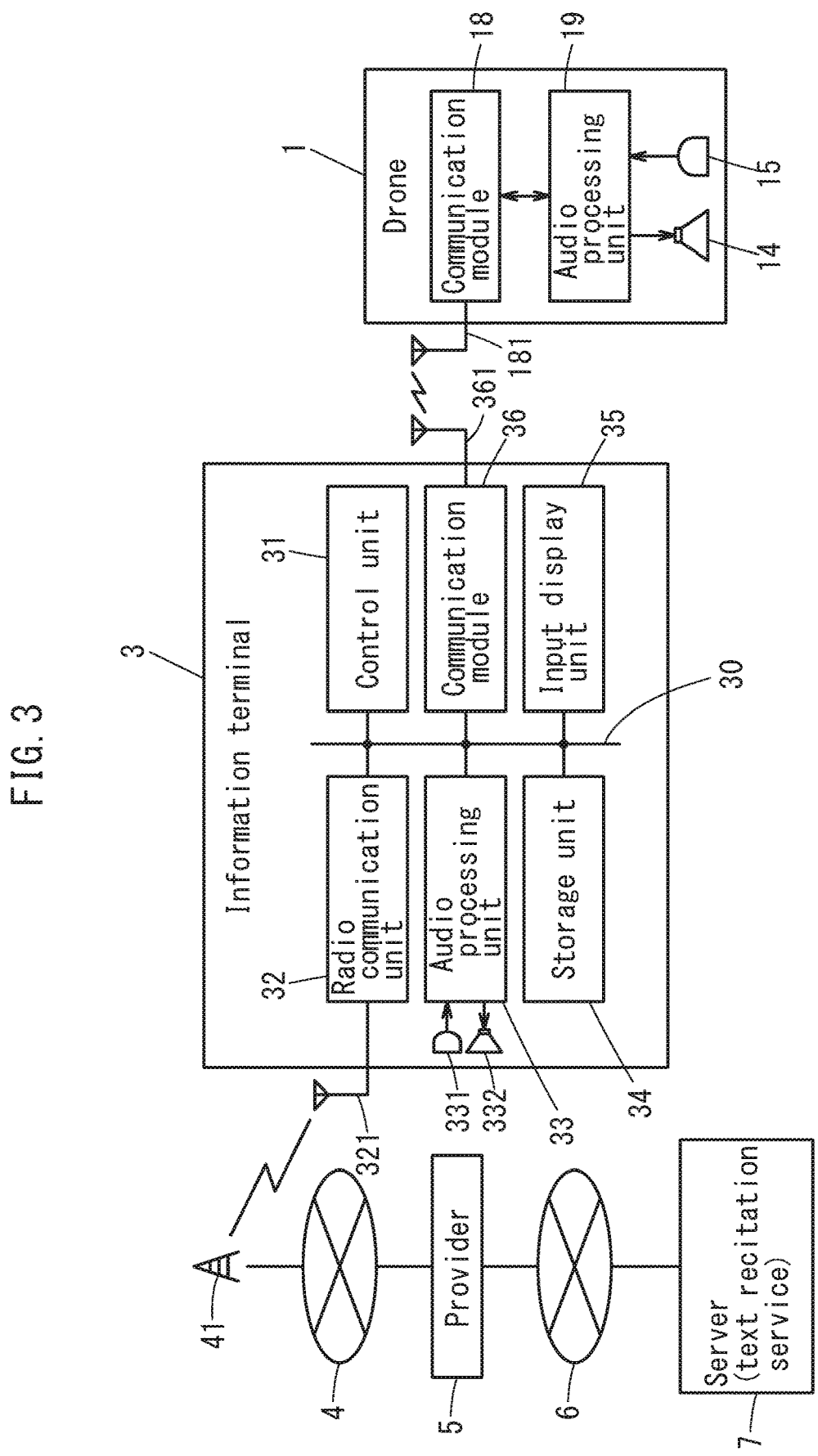
FIG. 3 is a block diagram showing a configuration of an audio data transmission system of Embodiment 1.

FIG. 3 shows a configuration of an audio data communication system. The audio data communication system is constituted by a communication system that acquires audio data from the server 7 of the "text recitation service" via an information terminal 3 possessed by the operator of the drone 1, a public telephone network 4, a provider 5, and the Internet 6, and a communication system that transmits the audio data acquired by the information terminal 3 to the speaker 14 mounted on the drone 1 by radio.

In the present embodiment, a tablet computer including a mobile phone function is employed as the information terminal 3. The information terminal 3 can communicate with the provider 5 via a radio base station 41 and the public telephone network 4. The provider 5 provides a service for connecting the public telephone network 4 and the Internet 6 to the information terminal 3, which is a user of the public telephone network 4. Hereinafter, the public telephone network 4, the provider 5, and the Internet 6 will collectively be referred to as "networks".

First, the configuration and function of the information terminal 3 will be described. The information terminal 3 is constituted by a control unit 31, a radio communication unit 32, an audio processing unit 33, a storage unit 34, an input display unit 35, and a communication module 36, and these members are connected to each other by an internal bus 30. Also, an antenna 321 that communicates by radio with the base station 41 is connected to the wireless communication unit 32, and a microphone 331 for audio input and a speaker 332 for audio output are connected to the audio processing unit 33. Furthermore, an antenna 361 for communicating with a communication module 18 mounted on the drone 1 is connected to the communication module 36.

The control unit 31 is constituted by a CPU, a ROM, and a RAM and is equipped with an operation system so as to be able to realize a function similar to that of a personal computer, although this is not shown in the drawings.

The wireless communication unit 32 converts audio data input from the audio processing unit 33 and text data input from the input display unit 35 into high-frequency signals and transmits the high-frequency signals to the base station 41 of the public telephone network 4 via the antenna 321. Also, the radio communication unit 32 receives the high-frequency signals transmitted from the base station 41 and retrieves and reproduces data such as audio and images from the received high-frequency signals.

The audio processing unit 33 generates audio data based on an audio signal of the operator input to the microphone 331, expands and decodes the audio data retrieved by the wireless communication unit 32 to reproduce the audio signal, and outputs the reproduced audio signal from the speaker 332.

The storage unit 34 is constituted by a non-volatile memory, and stores various types of programs that are needed for the operation of a mobile phone, personal data such as an address book, Internet browsing software for accessing a server that provides a "text recitation service", and application software for a "text recitation service".

The input display unit 35 is constituted by a touch panel display, the screen displays input keys such as characters and numerals, and text data such as characters and numerals are input by the operator touching (with a finger) these input keys. The screen of the input display unit 35 displays an image of a website sent from the server 7 via the Internet 6 and the public telephone network 4.

The communication module 36 mutually communicates with the drone 1, and in the present embodiment, a digital audio module that performs radio communication in a 2.4 GHz band is employed thereas.

On the other hand, a communication module 18 having a function similar to that of the communication module 36 of the information terminal 3 and an audio processing unit 19 are mounted on the airframe 10 of the drone 1, and the speaker 14 and microphone 15 are connected to the audio processing unit 19. The audio processing unit 19 converts the digital audio data sent from the information terminal 3 into an analog audio signal and converts the analog audio signal input from the microphone 15 into digital audio data. Accordingly, the information terminal 3 and the drone 1 can communicate, similarly to a normal radio.

Note that the speaker 14 attached to the drone 1 needs to reliably transmit an audio message to a target person on the ground from the air, and therefore it is preferable that the speaker 14 is lightweight and is suitable for transmitting an audio message. A piezoelectric speaker such as that disclosed in JP 2015-126535A is preferably used as this kind of speaker.

Content of "Text Recitation Service"

Next, the "text recitation service" provided by the server 7 will be described with reference to FIG. 3 described above and FIG. 4, which is new. In the present embodiment, description will be given taking, as an example, a case in which a foreign person visits Japan for the purpose of sightseeing.

In the following description, the "text recitation service" is, for example, a service provided under the name "Amazon Polly", which is a service that translates a Japanese sentence into a designated foreign language and outputs it as audio.

Figure 4:
FIG. 4 is a diagram showing an input screen for a "text recitation service".

FIG. 4 shows an input screen S of the "text recitation service". The operator uses the information terminal 3 to access the server 7 and open the input screen S of the "text recitation service". Then, the operator writes Japanese text data that is to be translated in a frame F1 in the upper portion of the screen S. Then, the operator opens the window of a frame F2 in the lower level of the screen S to specify the language to be translated, and further designates whether audio output is to be performed using a male voice or a female voice.

The frame F2 displays two buttons, namely "listen to audio" and "MP3 download". When the user touches (with a finger) the "listen to audio" button, the content of the text data translated to the language designated using the speaker 332 of the information terminal 3 is output using a male or female voice.

On the other hand, when the user touches the "MP3 download" button, the audio data that has been compressed and encoded using MP3 (MPEG-1 Audio Layer-3) format is downloaded to the information terminal 3 and is stored in the storage unit 34.

In the case where the audio data stored in the storage unit 34 of the information terminal 3 is to be output from the speaker 14 of the drone 1, if the operator of the information terminal 3 instructs transmission of the audio data from the input display unit 35, MP3-format audio data read out from the storage unit 34 is expanded, decoded, and converted into digital audio data by the audio processing unit 33, and then is converted into a high-frequency signal by the communication module 36 and is transmitted from the antenna 361 as a radio signal.

Upon receiving the above-described radio signal using the antenna 181, the drone 1 demodulates the audio data using the communication module 18, further converts the demodulated audio data into an analog audio signal using the audio signal unit 19, and thereafter outputs the analog audio signal from the speaker 14.

Operation of Audio Transmission System Next, operations of the audio transmission system according to the present invention will be described, envisioning a specific scene. As described above, when a disaster occurs, the audio transmission system is used when guiding foreign people at the disaster-stricken area to evacuate, and when causing foreign people who have entered a dangerous area to move out of the dangerous area.

Hereinafter, operations of an audio transmission system will be described, envisioning a case in which, when a foreign person visiting a ski resort enters a no-skiing area and skis, the foreign person is called to move out of the area from a speaker of a drone. It is assumed that it is known from a survey carried out in advance that in addition to Japanese people, many tourists from Australia and China visit this ski resort.

Before flying the drone 1, the operator uses the information terminal 3 to access the server 7 for the "text recitation service" and acquire audio data to be output from the speaker 14 of the drone 1. Specifically, as written in the frame F1 of FIG. 4, Japanese text data meaning "This is a no-skiing area. Please move out of it." is input.

According to the result of a survey carried out in advance, it is known that many tourists from Australia and China in addition to Japan visit this ski resort, and thus Japanese, English, and Chinese are selected as languages for prompting moving out of the no-skiing area. Also, the "text recitation service" is used to acquire MP3-format audio data of the English and Chinese for "This is a no-skiing area. Please move out of it." and the audio data is stored in the storage unit 34 of the information terminal 3.

The audio data of the Japanese meaning "This is a no-skiing area. Please move out of it." created by the operator of the information terminal using the microphone 331 is subjected to D/A conversion by the audio processing unit 33 and digital audio data is prepared. Also, the operator prepares English and Chinese digital audio data due to the audio processing unit 33 expanding and decoding MP3-format audio data stored in the storage unit 34.

The Japanese, English, and Chinese digital audio data prepared in this manner are arranged sequentially at a predetermined time interval according to an instruction input to the input display unit 35, and thus audio data to be reproduced from the speaker 14 of the drone 1 is created. The created audio data is stored in the storage unit 34.

Next, the operator moves to the area to be monitored, or in this case, the ski resort, holding the drone 1, the steering terminal 2, and the information terminal 3. Since it is a general principle that the flight of the drone is performed in a visible region while being monitored by two people, it is preferable to use a mode in which one person operates the steering terminal 2 to steer the drone 1, and another person operates the information terminal 3 to cause the above-described message to be reproduced from the speaker 14 of the drone 1.

The operator operates the steering terminal 2 to cause the drone 1 to fly over the no-skiing area that is being monitored. At this time, the drone 1 may be moved while manually operating joysticks (input apparatuses) 23 of the steering terminal 2, or the drone 1 can be caused to fly autonomously on a route and at an altitude stored in the storage unit 162 of the control apparatus 16.

During the flight of the drone 1, the operator checks an image captured by the video camera 12 on the monitor 21 of the steering terminal 2, and if it is discovered that a person has entered the no-skiing area, the operator operates the joysticks of the steering terminal 2 to move the drone 1 to the air above the target person and cause the drone 1 to hover there.

In this state, the other operator operates the information terminal 3 to read out the audio data stored in the storage unit 34 and transmit the audio data to the drone 1 using the communication module 36. The audio data received by the communication module 18 of the drone 1 is output from the speaker 14, and the message "This is a no-skiing area. Please move out of it." in Japanese, English, and Chinese is repeatedly reproduced at a certain time interval.

As described above, there is a high likelihood that the target person visiting this area is Japanese, Australian, or Chinese, and therefore the occurrence of an accident can be prevented by prompting movement out of the no-skiing area using the above-described message.

Embodiment 2

In Embodiment 1, the drone was moved to the air above the target person by the operator manually operating the joysticks of the steering terminal 2 with respect to the target person shown on the monitor 24 of the steering terminal 2, but since the imaging range of the video camera 12 changes accompanying movement, it is necessary to change the imaging direction of the video camera 12 by controlling the direction controller 13.

However, training is needed in order to change the imaging direction of the video camera 12 while steering the drone 1, and manual operation of the drone will be a hindrance in the case of wanting to quickly convey to the target person that the area is dangerous. In view of this, in the present embodiment, movement to the air above the target person is performed autonomously by the drone.

Figure 5:
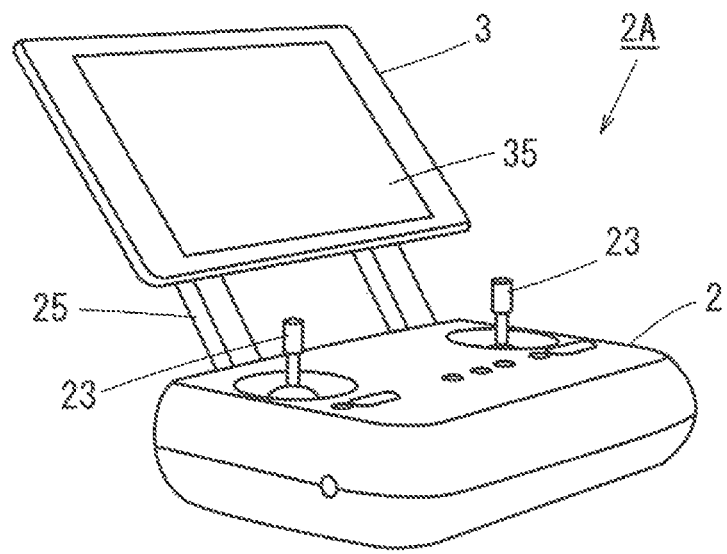
FIG. 5 is a perspective view showing an external appearance of a drone used in Embodiment 2 of the present invention.

FIG. 5 shows an external appearance of the steering terminal 2 and the information terminal 3 used in the present embodiment. In the present embodiment, portability and operability of the terminal are improved by using a terminal 2A in which the steering terminal 2 and the information terminal 3 are integrated.

Specifically, as shown in FIG. 5, a pair of arms 25 are attached to a housing of the steering terminal 2 and the information terminal 3 is fixed to the arms. Furthermore, in an integrated terminal 2A shown in FIG. 5, the monitor 24 of the steering terminal 2 is removed, and its function is included in a touch panel display, which is the input display unit 35 of the information terminal 3. Accompanying this, the input display unit 35 is used not only for the function of a monitor, but also as a touch panel input means.

Figure 6:
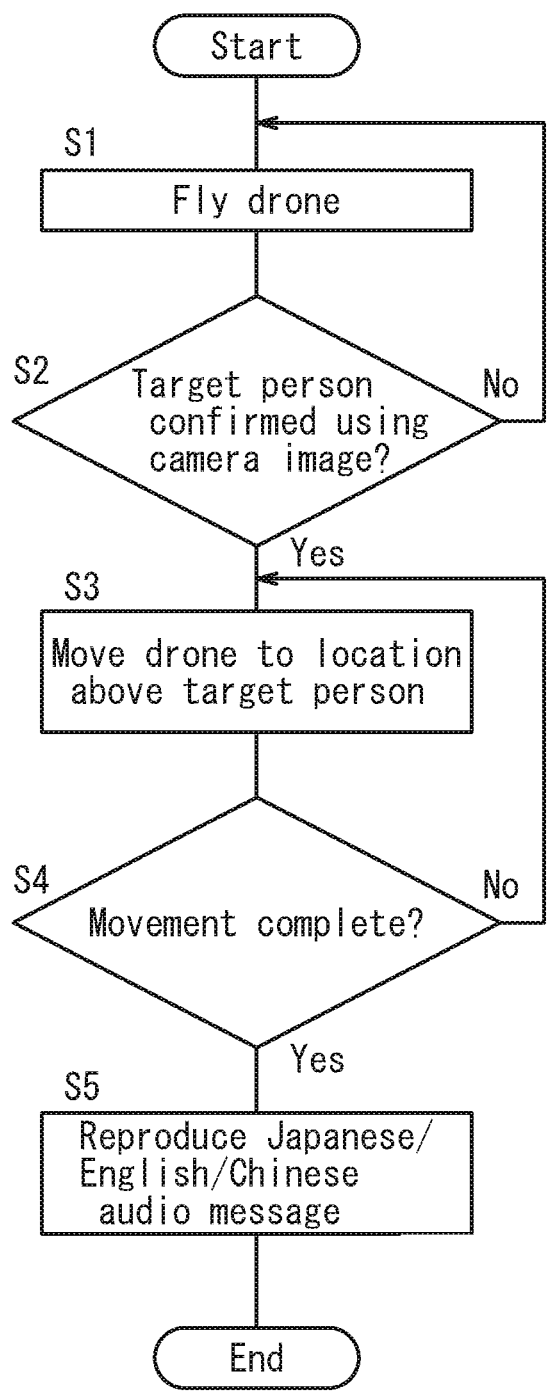
FIG. 6 is a flowchart showing a step of realizing autonomous movement of a drone.
Figure 7:
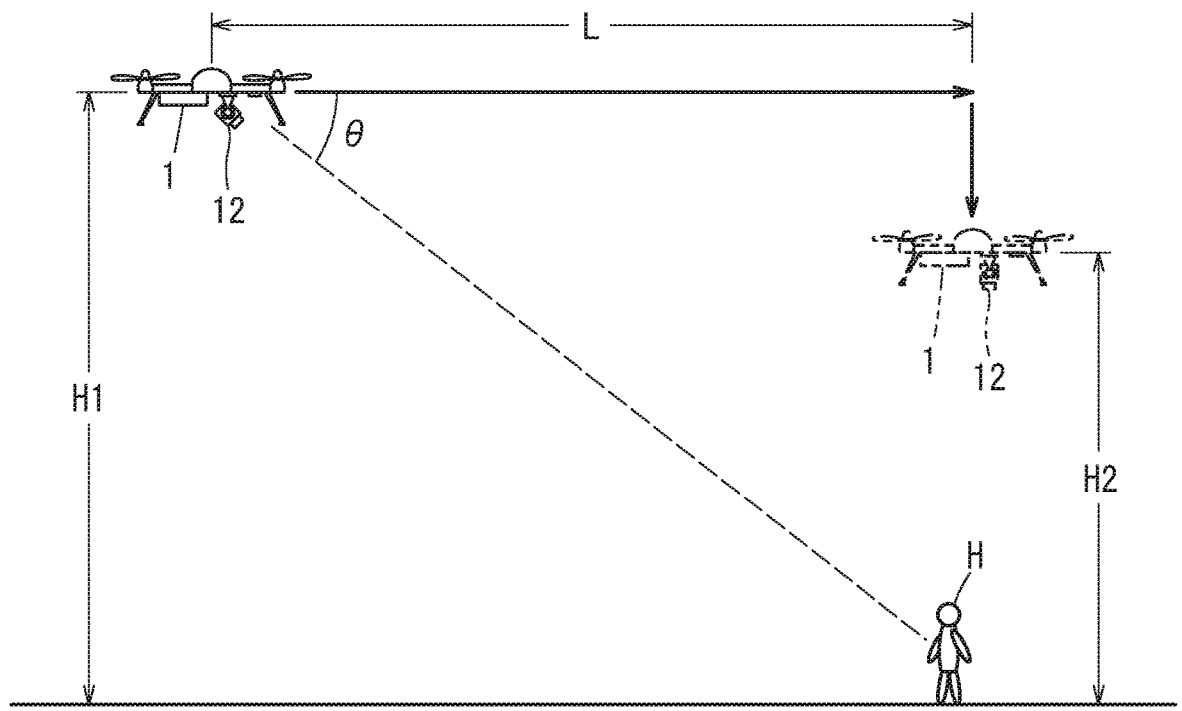
FIG. 7 is a diagram showing a state of autonomous flight of a drone.

Next, autonomous movement of the drone 1 will be described with reference to FIGS. 6 and 7. FIG. 6 is a flowchart showing a step of realizing autonomous movement of the drone 1, and FIG. 7 is a diagram showing a state of flight of the drone 1 at that time.

It is assumed that the drone flies in the air over a no-skiing area at a height H1 due to an operation performed by the operator (step S1). As described above, during the flight of the drone 1, the operator can view an image captured by the video camera 12 of the drone 1 using the monitor 35 of the integrated terminal shown in FIG. 5. In the state shown in FIG. 7, an image taken obliquely downward in the forward direction of the drone 1 is shown on the screen of the monitor 35.

If it is confirmed using the monitor 35 that the target person H has entered the no-skiing area (Yes in step S2), the operator touches (with a finger) the target person displayed on the screen of the monitor 35 and thus instructs the drone 1 to move to a location above the target person H (step S3).

A program for moving the drone to a position touched on a screen of the monitor 35 is stored in advance in the storage unit 162 of the control apparatus 161 of the drone 1, and the control apparatus 161 reads out and executes this program to move the drone 1 to the designated position.

Specifically, in FIG. 7, the drone 1 moves a horizontal distance L=H1/tan θ from the drone 1 to the target person H, where H1 is the height of the drone 1 and θ is the inclination angle of the video camera 12 with respect to the horizon (step S3). Next, the drone 1 lowers to a height H2 at which the audio of the speaker will reach the target person H at that position (Yes in step S4), and the drone 1 hovers there.

Thereafter, the information terminal 3 reads out the audio data stored in the storage unit 34, that is, the audio data obtained by sequentially arranging the Japanese, English, and Chinese messages meaning "This is a no-skiing area. Please move out of it." with a certain time interval, and transmits the audio data to the drone 1 using the communication module 18. Upon receiving the above-described audio data, the drone 1 converts the digital audio data into an analog audio signal using the audio processing unit 19, and thereafter outputs the analog audio signal from the speaker 14.

As described above, in the present embodiment, if the operator touches a target person shown on the monitor screen of the integrated terminal 2A, the drone thereafter autonomously moves to a location above the target person, and therefore the steering of the drone is dramatically simplified.

Note that in the present embodiment, description was given premised on the fact that the drone is flown during the day, but the drone can autonomously fly at night through a similar operation if an infrared camera is mounted on the drone instead of the video camera 12.

Embodiment 3

Figure 8:
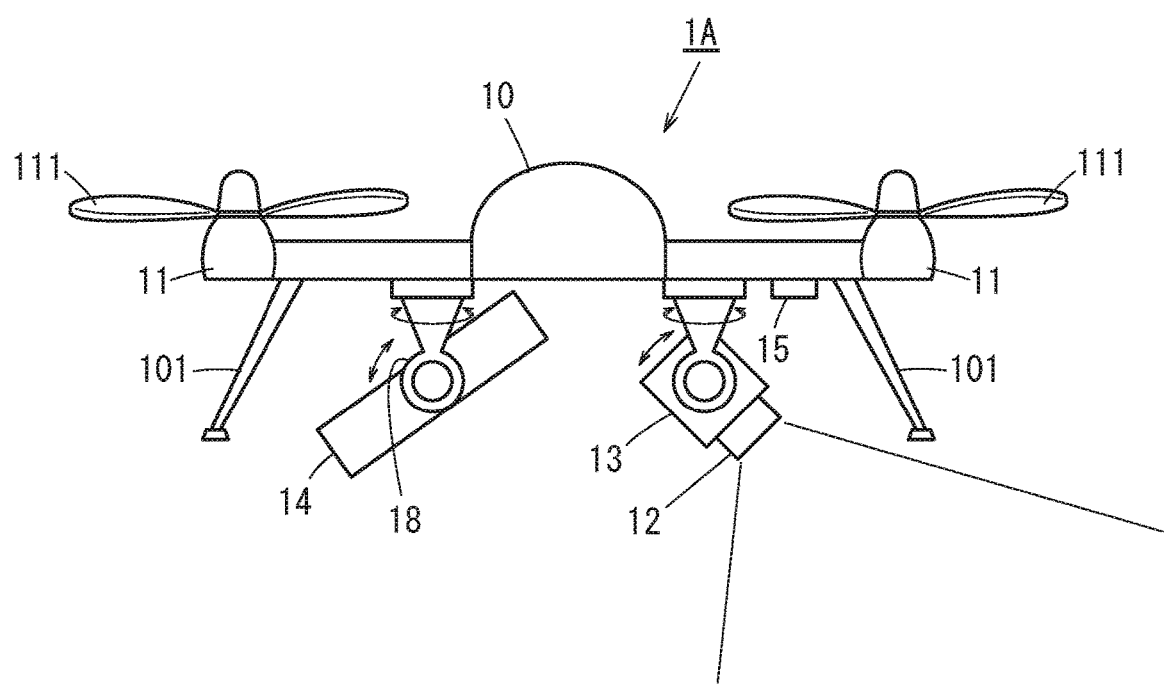
FIG. 8 is a plan view showing an external appearance of a drone used in Embodiment 3 of the present invention.

FIG. 8 shows a configuration of the drone 1 to be used in the present embodiment. In the present embodiment, unlike the configuration shown in FIG. 1, the speaker 14 is attached to the airframe 10 of the drone via a direction controller 18 including a function similar to that of the direction controller 13.

In the above-described Embodiments 1 and 2, a case was described in which an audio message is output from a speaker fixed to the lower surface of the airframe 10 of the drone 1. In this case, due to the orientation characteristic of the speaker, unless the drone 1 is moved to the air above the target person, the audio message cannot be transmitted to the target person in some cases.

In contrast to this, in the present embodiment, since the direction controller 13 and the direction controller 18 are operated in synchronization with each other, the imaging direction of the video camera 12 and the audio transmission direction of the speaker 14 always match. If this kind of configuration is employed, in the case where the distance between the drone and the target person is short, the audio message can be transmitted without moving the drone 1 to a location above the target person, as long as the audio message is transmitted to the target person shown on the screen of the monitor 25.

The drone according to the present embodiment is particularly effective when transmitting a message from the drone to the target person at a location at which a wall or a branch, which are obstacles on the flight path, is present, such as near an entrance to a cave or at the base of a large tree.

However, if the above-described configuration is employed, the overall weight of the drone increases due to the installation of the direction controller 18, and the distance the drone can fly is shortened, and therefore employment of the above-described configuration needs to be determined upon comparison and consideration of the advantages and disadvantages of installing the direction controller.

Note that in the above-described embodiments, a case was described in which messages in Japanese, English, and Chinese are transmitted by audio according to the number of foreign people that visit the area, but the languages to be transmitted are not limited thereto. In actuality, more than twenty languages are provided by the "text recitation service", and therefore it is sufficient to select the language according to the foreign people that visit the area.

Also, in the above-described embodiments, it was described that the audio transmission system according to the present invention is effective in the case of guiding people to evacuate when a disaster occurs, and in the case of giving a warning that entry of a dangerous area or the like is prohibited. However, the application of the present invention is not limited thereto. For example, if an event is held at a large venue, people can be smoothly guided by broadcasting a guiding message in a specific language from a drone without posting an usher.

Furthermore, in the above-described embodiments, an audio message in multiple languages prepared by an operator in advance was output from a speaker at a predetermined time interval. In contrast to this, if software that can recognize a face is installed in the steering terminal, a person's race is determined based on the frame and facial features of the person shown on the monitor screen, and an audio message in a language thought to be most appropriate for that race is transmitted, transmission in unneeded languages can be omitted, and message transmission can be achieved with greater efficiency.

Hereinafter, preferable examples of embodiments of the present invention will be summarized.

It is preferable that the unmanned aircraft is equipped with a video camera, and the steering terminal is equipped with a monitor configured to display an image captured by the video camera, and when a target person to whom an audio message is to be transmitted appears on a screen of the monitor, the information terminal reads out the audio data in the designated language and transmits the read-out audio data to the unmanned aircraft in accordance with an operator instruction.

Also, it is preferable that the audio data of the text data created in the official language is stored in advance in a storage unit of the information terminal, the information terminal creates audio data in a plurality of languages by sequentially arranging, at a predetermined time interval, the audio data in the designated language downloaded from the server and the audio data in the official language read out from the storage unit, and transmits the audio data in the plurality of languages to the unmanned aircraft, and the unmanned aircraft repeatedly outputs the audio data in the plurality of languages from the speaker.

It is preferable that the steering terminal and the information terminal are constituted integrally, and an input display unit of the information terminal is constituted by a touch-panel display, and the touch-panel display functions as both an input apparatus and a monitor of the steering terminal.

It is preferable that the video camera is attached to the airframe of the unmanned aircraft via a first direction controller that can change an imaging direction, and the imaging direction can be changed according to an operator instruction, which is input to the steering terminal.

It is preferable that when the operator designates a target person to whom the audio message is to be transmitted and who appears on the screen of the monitor, the unmanned aircraft autonomously flies above the target person.

It is preferable that the speaker is attached to the airframe of the unmanned aircraft via a second direction controller that can change an audio transmission direction, and the second direction controller operates in synchronization with the first direction controller.

Although the present invention has been fully described by way of example with reference to the accompanied drawings, it is to be understood that various changes and modifications will be apparent to those skilled in the art.

Therefore, unless otherwise such changes and modifications from the scope of the present invention hereinafter defined, they should be construed as being included therein.

What is claimed is:

1. An audio transmission system comprising:
   an unmanned aircraft including a plurality of rotors, the unmanned aircraft being able to fly upward, downward, leftward, and rightward in air, and having an airframe to which a speaker is attached;
   a steering terminal that can communicate with the unmanned aircraft by radio, the steering terminal being used to steer the unmanned aircraft; and
   an information terminal configured to access, via a network, a server providing a service for translating text data created in an official language of a country into a designated language other than the official language, and converting the translated text data into audio data, the information terminal being able to download the audio data from the server,
   wherein the information terminal transmits the audio data in the designated language downloaded from the server to the unmanned aircraft,
   the unmanned aircraft outputs the audio data in the designated language as an audio message from the speaker attached to the airframe,
   the unmanned aircraft is equipped with a video camera, and the steering terminal is equipped with a monitor configured to display an image captured by the video camera,
   the audio data of the text data created in the official language is stored in advance in a storage unit of the information terminal,
   the information terminal creates audio data in a plurality of languages by sequentially arranging, at a predetermined time interval, the audio data in the designated language downloaded from the server and the audio data in the official language read out from the storage unit, and transmits the audio data in the plurality of languages to the unmanned aircraft, and
   the unmanned aircraft repeatedly outputs the audio data in the plurality of languages as an audio message from the speaker.

2. The audio transmission system according to claim 1, wherein
   when a target person to whom an audio message is to be transmitted appears on a screen of the monitor, the information terminal reads out the audio data in the designated language and transmits the read-out audio data to the unmanned aircraft in accordance with an operator instruction.

3. The audio transmission system according to claim 2, wherein
   the steering terminal and the information terminal are constituted integrally, and an input display unit of the information terminal is constituted by a touch-panel display, and
   the touch-panel display functions as both an input apparatus and a monitor of the steering terminal.

4. The audio transmission system according to claim 2, wherein
   the video camera is attached to the airframe of the unmanned aircraft via a first direction controller that can change an imaging direction, and the imaging direction can be changed according to an operator instruction, which is input to the steering terminal.

5. The audio transmission system according to claim 2, wherein
   when the operator touches a target person to whom the audio message is to be transmitted and who appears on the screen of the monitor, the unmanned aircraft autonomously flies above the target person at a height at which the audio of the speaker will reach the target person, and the unmanned aircraft outputs the audio data in the plurality of languages from the speaker.

6. The audio transmission system according to claim 4, wherein
   the speaker is attached to the airframe of the unmanned aircraft via a second direction controller that can change an audio transmission direction, and the second direction controller operates in synchronization with the first direction controller.

7. The audio transmission system according to claim 4, wherein
   when the operator designates a target person to whom the audio message is to be transmitted and who appears on the screen of the monitor, the unmanned aircraft autonomously flies above the target person.

8. An audio transmission system comprising:
   an unmanned aircraft including a plurality of rotors, the unmanned aircraft being able to fly upward, downward, leftward, and rightward in air, and having an airframe to which a speaker is attached;
   a steering terminal that can communicate with the unmanned aircraft by radio, the steering terminal being used to steer the unmanned aircraft; and
   an information terminal configured to access, via a network, a server providing a service for translating text data created in an official language of a country into a designated language other than the official language, and converting the translated text data into audio data, the information terminal being able to download the audio data from the server,
   wherein the information terminal transmits the audio data in the designated language downloaded from the server to the unmanned aircraft,
   the unmanned aircraft outputs the audio data in the designated language as an audio message from the speaker attached to the airframe,
   the audio data of the text data created in the official language is stored in advance in a storage unit of the information terminal,
   the information terminal creates audio data in a plurality of languages by sequentially arranging, at a predetermined time interval, the audio data in the designated language downloaded from the server and the audio data in the official language read out from the storage unit, and transmits the audio data in the plurality of languages to the unmanned aircraft, and
the unmanned aircraft repeatedly outputs the audio data in the plurality of languages from the speaker.

* * * * *